(12) United States Patent
Crim et al.

(10) Patent No.: US 7,958,146 B2
(45) Date of Patent: *Jun. 7, 2011

(54) USING A CALCULATION EXPRESSION TO DEFINE AND CONTROL ACCESS RIGHTS FOR RECORDS IN A DATABASE

(75) Inventors: Christopher Crim, San Jose, CA (US); Stephen Iremonger, Mountain View, CA (US); L. Lee McIntyre, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/773,607

(22) Filed: May 4, 2010

(65) Prior Publication Data

US 2010/0217779 A1 Aug. 26, 2010

Related U.S. Application Data

(63) Continuation of application No. 09/771,143, filed on Jan. 26, 2001, now Pat. No. 7,739,298.

(51) Int. Cl.
*G06F 17/30* (2006.01)
(52) U.S. Cl. .................. 707/781; 707/783; 707/785
(58) Field of Classification Search .................. None
See application file for complete search history.

(56) References Cited

U.S. PATENT DOCUMENTS

| | | | |
|---|---|---|---|
| 5,542,024 A | 7/1996 | Balint et al. | |
| 5,572,673 A | 11/1996 | Shurts | |
| 5,826,268 A | 10/1998 | Schaefer et al. | |
| 6,236,996 B1 | 5/2001 | Bapat et al. | |
| 6,263,339 B1 | 7/2001 | Hirsch | |
| 6,275,825 B1 | 8/2001 | Kobayashi et al. | |
| 6,289,462 B1 | 9/2001 | McNabb et al. | |
| 6,308,173 B1 | 10/2001 | Glasser et al. | |
| 6,385,731 B2 | 5/2002 | Ananda | |
| 6,434,552 B1 | 8/2002 | Leong | |
| 6,460,041 B2 | 10/2002 | Lloyd | |
| 6,493,700 B2 | 12/2002 | Couch et al. | |
| 6,651,067 B1 | 11/2003 | Gorelik et al. | |
| 6,763,344 B1 | 7/2004 | Osentoski et al. | |
| 6,785,810 B1 * | 8/2004 | Lirov et al. | 713/165 |

(Continued)

OTHER PUBLICATIONS

Elmasri et al., "Fundamentals of Database Systems", Buschlen/Mowatt Fine Arts Ltd., Copyright 2000, Third Edition, pp. 277-278.*

(Continued)

*Primary Examiner* — Hung Q Pham
(74) *Attorney, Agent, or Firm* — Beyer Law Group LLP

(57) ABSTRACT

Techniques for providing limited access to data stored in records of databases are disclosed. The techniques can be implemented in a database program operating on a computer system. The database program can provide a Graphical User Interface that can be used to conveniently define calculation expressions that limit operations on the records of the database. The calculation expression can be defined for a user or group of users with respect to a particular operation that can be requested to be performed on the records of the database. The calculation expression can be defined based on fields of the records, as well as other information, for example, various state variables of the database (e.g., date, time, number of records, etc.) The calculation expression can, in turn, be evaluated with respect to each record to determine whether a request to perform an operation on that particular record should be granted or denied.

15 Claims, 10 Drawing Sheets

U.S. PATENT DOCUMENTS 7,634,455 B1 * 12/2009 Keene et al. .......................... 1/1

OTHER PUBLICATIONS

Office Action dated Dec. 20, 2002 from U.S. Appl. No. 09/771,143.
Office Action dated Jun. 23, 2003 from U.S. Appl. No. 09/771,143.
Office Action dated Jan. 2, 2004 from U.S. Appl. No. 09/771,143.
Office Action dated Jun. 1, 2004 from U.S. Appl. No. 09/771,143.
Office Action dated Nov. 16, 2004 from U.S. Appl. No. 09/771,143.
Office Action dated May 18, 2005 from U.S. Appl. No. 09/771,143.
Office Action dated Dec. 9, 2005 from U.S. Appl. No. 09/771,143.
Office Action dated May 25, 2006 from U.S. Appl. No. 09/771,143.
Notice of Allowance dated Feb. 19, 2010 from U.S. Appl. No. 09/771,143.
Prague et al., *Microsoft Access 2000 Bible*, published by Hungry Minds, Inc., New York, New York.
Elmasri et al., Fundamentals of Database System, ISBN 0-8053-1755-4, Copyright 2000, p. 718.

* cited by examiner

USING A CALCULATION EXPRESSION TO DEFINE AND CONTROL ACCESS RIGHTS FOR RECORDS IN A DATABASE

CROSS-REFERENCES TO RELATED APPLICATIONS

This application is a Continuation of and claims priority under 35 U.S.C. §120 to U.S. patent application Ser. No. 09/771,143, filed Jan. 26, 2001 and entitled "USING A CALCULATION EXPRESSION TO DEFINE AND CONTROL ACCESS RIGHTS FOR RECORDS IN A DATABASE," which is hereby incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to databases and, more particularly, to controlling access to data stored in records of a database.

2. Description of the Related Art

Databases are used to store data in a manner that facilitates subsequent use of the data. A database includes one or more files, each of which contains one or more records. A record holds information about a subject or item in its various fields.

To allow a user to more easily access and manage a database, database programs have recently been developed. Database programs often provide a user interface which allows the user to conveniently interact with the database program. Accordingly, by interacting with the user interface, the user of the database can perform various operations on the data stored in the database. The interface can be a Graphical User Interface that allows users to conveniently interact with the database program and, in turn, with the database. For example, a user may interact with the user interface to view the data in various ways. The visual representations provided to the user can include, for example, a browse mode. The browse mode allows records to be viewed, changed, sorted, deleted, or added.

FIG. 1 is a representative screen depiction from a conventional database program, namely, FileMaker Pro 4.0 by FileMaker Pro, Inc. of Santa Clara, Calif. The screen depiction pertains to an asset management database having three records. A browse mode for the first record of the ASSET MANAGEMENT database is depicted. The browse mode is suitable for on-line or screen viewing of the records of the asset management database and allows the records to be viewed or deleted. The data in the fields of the record can be changed, sorted, deleted or added in the browse mode.

Accordingly, a database program provides the user of the database with the ability to conveniently perform various operations on data stored in the database. As will be appreciated, at times it is desirable to limit a user's access to data. Moreover, it is highly desirable to provide the ability to limit the access privileges of the users of the database with respect to operations that can be performed on the database on a record by record basis. This allows the flexibility to control access to the record in the database based on assigned access privileges.

Unfortunately, conventional database programs do not provide the ability to conveniently control the access privileges of the users of the database with respect to data stored in a particular record. Typically, conventional database programs allow a user to have access to all the records stored in the database in a file or no access at all to any of the records in that file. Similarly, a user of a conventional database program may be provided access to a particular field in all of the records in a file or no access at all to that particular field in any of the records in that file.

It should be noted that controlling access privileges to various records of some conventional databases may be achieved using conventional techniques. However, this is achieved with some difficulty. Typically, providing record level access in these conventional databases requires knowledge of the implementation details of the database, as well as a significant amount of programming (e.g., writing programming scripts). Accordingly, programming to provide record level access cannot be done conveniently by a user who may not have programming experience and/or knowledge of the implementation details of the database or database program. Furthermore, these conventional databases typically do not provide a Graphical User Interface that can be used to conveniently control access to records of a database on a record by record basis. Thus, the ability to conveniently limit access privileges of the users of the database on a record by record basis is not provided by conventional database programs. Furthermore, controlling access on a record by record basis can only be achieved with difficulty on some conventional databases (e.g., writing programming scripts).

In view of the foregoing, there is a need for improved techniques to control access to records stored in databases.

SUMMARY OF THE INVENTION

Broadly speaking, the invention relates to techniques for controlling access to data stored in records of a database. In accordance with one aspect of the invention, techniques for defining limited record level access for a user or group of users of the database are disclosed. In one embodiment, the techniques are implemented in a database program operating on a computer system. The database program provides a Graphical User Interface that can be used to conveniently define expressions that limit operations that can be performed on various records of the database. The expression can be defined for a user or group of users with respect to a particular operation performed on the records of the database. Accordingly, the expression can be based on fields of the records as well as other information, for example, various state variables of the database (e.g., date, time, number of records, etc.) The information provided in the calculation expression can, in turn, be evaluated with respect to the record to determine whether a request to perform an operation on that particular record should be granted or denied.

In accordance with another aspect of the invention, techniques for allowing access to a database based on defined access privileges are disclosed. In one embodiment, the calculation expression associated with a user's privileges is evaluated with respect to a requested operation to determine whether the requested operation should be granted or denied. The calculation expression can be defined based on fields, as well as state information of the database. The calculation expression can be evaluated based on the values of the fields in the record, as well as the values of state variables of the database. Accordingly, before a user is allowed to perform an operation on a record, the appropriate calculation expression is evaluated for that record. In this way, access can be granted or denied based on defined record level access privileges to control access to data stored in the database on a record by record basis.

The invention can be implemented in numerous ways, including as a method, an apparatus, a computer readable medium, and a database system. Several embodiments of the invention are discussed below.

As a method for controlling access to records stored in a database, one embodiment of the invention includes the acts of: (a) defining at least one expression associated with at least one record of the database; (b) evaluating the at least one expression for the at least one record; and (c) allowing access to the at least one record based on the evaluating of the at least one expression.

As another method for controlling access to records stored in a database, another embodiment of the invention includes the acts of: (a) identifying a password that is associated with one or more users of the database; (b) defining a calculation expression for the identified password, the calculation expression defining access privileges for the one or more users with respect to at least one operation that may be requested to be performed by the one or more users on one or more records of the database; (d) receiving a request to perform the at least one operation on one or more records of the database, the request being identified as a request made by the one or more users associated with the password; (e) evaluating the calculation expression when the request has been received; (f) granting the at least one operation to be performed when the evaluation returns a value to indicate that the at least one operation should be granted; and (g) denying the at least one operation to be performed when the evaluation returns another value to indicate that the at least one operation should be denied.

As a database system, one embodiment of the invention includes: a database having one or more records stored therein; a database program operating to provide a Graphical User Interface that can be used to perform operations on said one or more records stored in said database. The Graphical User Interface of the database program operates to provide the ability to define access privileges to said one or more records stored in said database.

As a computer readable medium including computer program code for controlling access to records stored in a database, one embodiment of the invention includes: computer program code for defining at least one expression associated with at least one record of the database; computer program code for evaluating the at least one expression for the at least one record; and computer program code for allowing access to the at least one record based on the evaluating of the at least one expression.

The advantages of the invention are numerous. Different embodiments or implementations may yield one or more of the following advantages. One advantage of the invention is that record level privileges can be defined for users of a database. Another advantage of the invention is that record level privileges can conveniently be defined through use of a graphical interface. Still another advantage is that the invention can be implemented without significant change to existing user interfaces of database programs. Yet another advantage of the invention is that complex calculation expressions may be constructed without requiring programming.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to techniques for controlling access to data stored in records of a database. In accordance with one aspect of the invention, techniques for defining limited record level access for a user or group of users of the database are disclosed. In one embodiment, the techniques are implemented in a database program operating on a computer system. The database program provides a Graphical User Interface that can conveniently be used to define expressions that limit operations that can be performed on various records of the database. The expression can be defined for a user or group of users with respect to a particular operation to be performed on the records of the database. Accordingly, the expression can be based on fields of the records as well as other information, for example, various state variables of the database (e.g., date, time, number of records, etc.) The information provided in the calculation expression can, in turn, be evaluated with respect to a record to determine whether a request to perform an operation on that particular record should be granted or denied.

In one embodiment, a calculation expression can conveniently be defined by interacting with a Graphical User Interface. The calculation expression can be defined by a user without requiring the user to have programming knowledge and/or familiarity with the implementation details of the database or database program. Thus, the database program provides the ability to conveniently define limitations of operations that can be performed on the data stored in the database on a record by record basis.

In accordance with another aspect of the invention, techniques for allowing access to a database based on defined access privileges are disclosed. In one embodiment, the calculation expression associated with a user's privilege is evaluated with respect to a requested operation to determine whether the requested operation should be granted or denied. As noted above, the calculation expression can be defined based on fields as well as state information of the database. The calculation expression can be evaluated based on the values of the fields in the record as well as the values of state variables of the database. Accordingly, before a user is allowed to perform an operation on a record, the appropriate calculation expression is evaluated for that record. In this way, access can be granted or denied based on defined record level access privileges to allow control of data stored in the database on a record by record basis.

Embodiments of these aspects of the invention are discussed below with reference to FIGS. 2-10. However, those skilled in the art will readily appreciate that the detailed description given herein with respect to these figures is for explanatory purposes as the invention extends beyond these limited embodiments.

Figure 1:
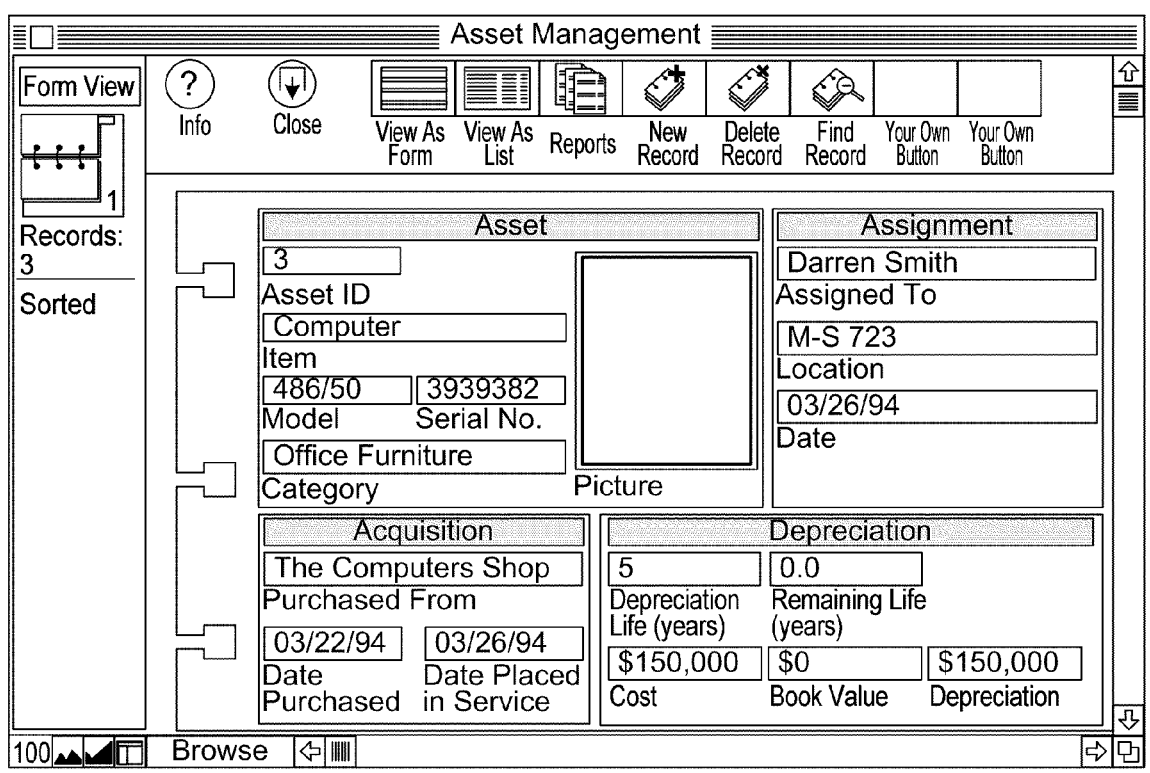
FIG. 1 is a representative screen depiction from a conventional database program.
Figure 2:
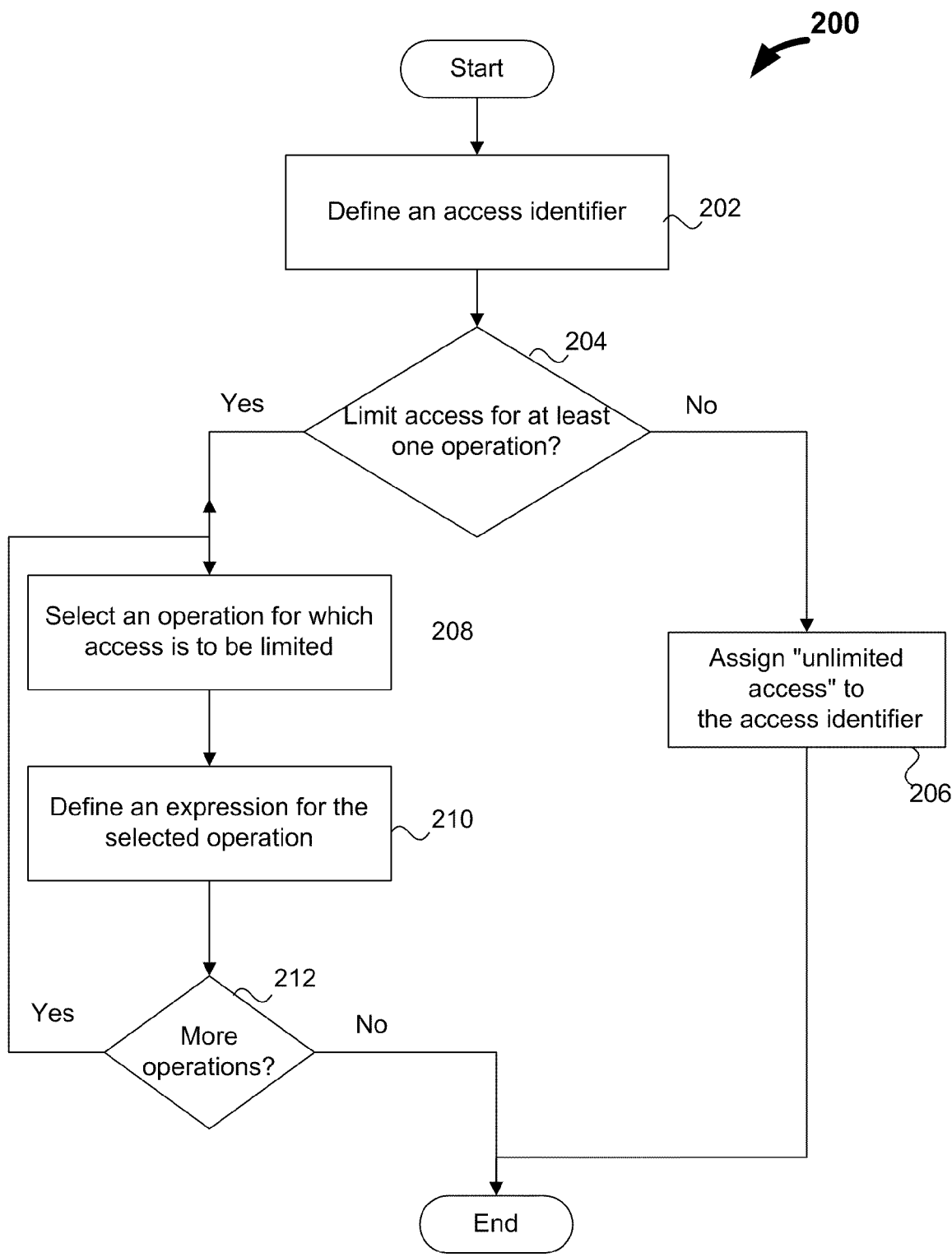
FIG. 2 illustrates a method for defining access privileges in accordance with one embodiment of the invention.

FIG. 2 illustrates a method 200 for defining access privileges for records stored in a database in accordance with one embodiment of the invention. Initially, at operation 202, an access identifier is defined. The access identifier can be, for example, a password which is associated with a user or group of users of the database. Accordingly, access privileges for the records stored in the database can be defined for the user or group of users associated with the access identifier. Next, at operation 204, it is determined whether the access privileges should be limited with respect to at least one operation that can be performed by the user or group of users on the records in the database. These operations include, for example, browsing, editing, deleting, searching and printing, as well as any other operation that a user or group of users may request to perform on the records of a particular database.

If it is determined at operation 204 that the access privileges should not be limited at all for the user of group of users associated with the access privileges identifier, the method 200 proceeds to operation 206 where the access privileges identifier is assigned (or defined) as "unlimited access". The method 200 ends following operation 206.

On the other hand, if it is determined at operation 204 that the access should be limited with respect to at least one operation that can be performed on the records of the database, the method 200 proceeds to operation 208 where an operation for which access should be limited is selected. Next, at operation 210, an expression for the selected operation is defined. As will be appreciated, the expression can be defined based on various fields of the records in the database, as well as other variables, for example, the state information of the database (e.g., date, time, number of records, etc.) Accordingly, limited access can be defined with respect to the selected operation based on the specified expression.

Next, at operation 212, a determination is made as to whether there is at least one more operation for which access should be defined as limited. If it is determined at operation 212 that there is not at least one more operation for which access should be defined as limited, the method 200 ends.

However, if it is determined at operation 212 that there is at least one more operation for which access should be defined as limited, the method 200 proceeds to operation 208 where an operation for which access is to be defined is selected. Following operation 208, the method 200 proceeds to operation 210 and then to operation 210 as described above. When it is determined at operation 212 that there is not at least one more operation for which access should be defined as limited, the method 200 ends.

Figure 3:
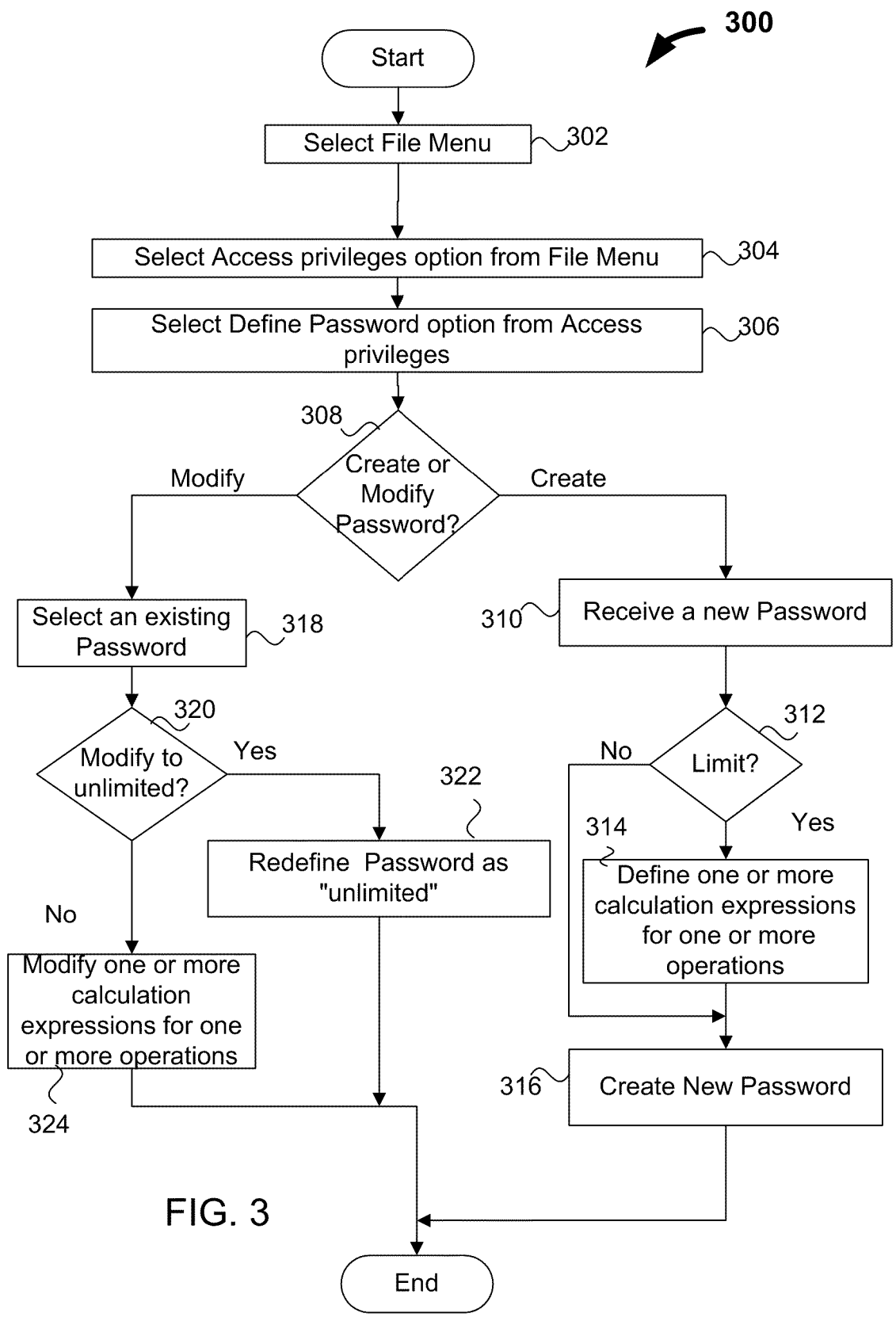
FIG. 3 illustrates a method for creating/modifying passwords with appropriate access privileges defined for them in accordance with one embodiment of the invention.

FIG. 3 illustrates a method 300 for creating (or modifying) passwords with the appropriate privileges for accessing data stored in records of a database. As noted above, a password can be associated with a user or group of users of the database. The method 300 can be, for example, implemented in a database program operating on a computer system. The database program can provide a Graphical User Interface (GUI) to allow creating (or modifying) the passwords in a convenient manner with the desired access privileges defined for them. Typically, only a system administrator is provided with the ability to create (or modify) access privileges defined for various passwords.

Initially, at operation 302, a "File Menu" option is selected. The selection can be, for example, made by a user by interacting with the GUI (e.g., by pointing and clicking with a mouse). Next, at operation 304, an "Access Privileges" option is selected from one or more options provided under the "File Menu" option. Again, a GUI may be used to make this selection, for example, by allowing a user to select the "Access Privileges" option from a menu list of available options. In a similar manner, at operation 306, a "Define Passwords" option can be selected. Next, at operation 308, a determination is made as to whether a new password is to be created or if access privileges for an existing password are to be modified.

If it is determined at operation 308 that a new password is to be created, the method 300 proceeds to operation 310 where a new password is received. For example, the new password can be entered by typing it into an appropriate window of the GUI. Next, at operation 312, a determination is made as to whether the access privileges for the new password should be limited with respect to at least one operation that can be performed on the records of the database. If it is determined at operation 312 that the password should not be limited with respect to at least one operation (unlimited access), the method 300 proceeds directly to operation 316 where the new password is created. It should be noted that in this case, no limitations are defined for the new password. Therefore, the new password is defined as a password with unlimited access privileges. The method 300 ends following operation 316.

However, if it is determined at operation 312 that the password should be limited with respect to at least one operation, the method 300 proceeds to operation 314 where one or more calculation expressions are defined with respect to one or more operations that can be performed on the records of the database. For example, a different calculation expression can be defined for each one of the operations. Alternatively, the same calculation expression may be defined for two or more various operations. Accordingly, at operation 316, a new password is created with limitations as defined at operation 314 (limited access). The method 300 ends following operation 316.

On the other hand, if it is determined at operation 308 that access privileges of an existing password are to be modified, the method 300 proceeds to operation 318 where an existing password is selected. The existing password can be selected by interacting with the GUI, for example, the user can select a password from a list of existing passwords displayed in a window. Next, at operation 320, a determination is made as to whether the existing password should be modified to have unlimited access privileges. If it is determined at operation 320 that the existing password should be defined with unlimited access privileges, the method 300 proceeds to operation 322 where the existing password is re-defined as having "unlimited access". The method 300 ends following operation 322.

However, if it is determined at operation 320 that the existing password should not be modified to have unlimited access, the method 300 proceeds to operation 324 where one or more existing calculation expressions are modified and/or one or more new calculation expressions are defined for the existing password. Accordingly, the existing password is modified with respect to its access privileges as defined by the new and/or modified calculation expressions. The method 300 ends following operation 324.

As noted above, the invention can be implemented in a database program operating on a computer system. The database program provides a Graphical User Interface that can conveniently be used to create or (modify) passwords with the desired access privileges defined for them. To illustrate, FIGS. 4-7 are screen depictions representative of an example of the GUI provided to allow creation and modification of passwords with the desired access privileges, according to one implementation of the invention.

Figure 4:
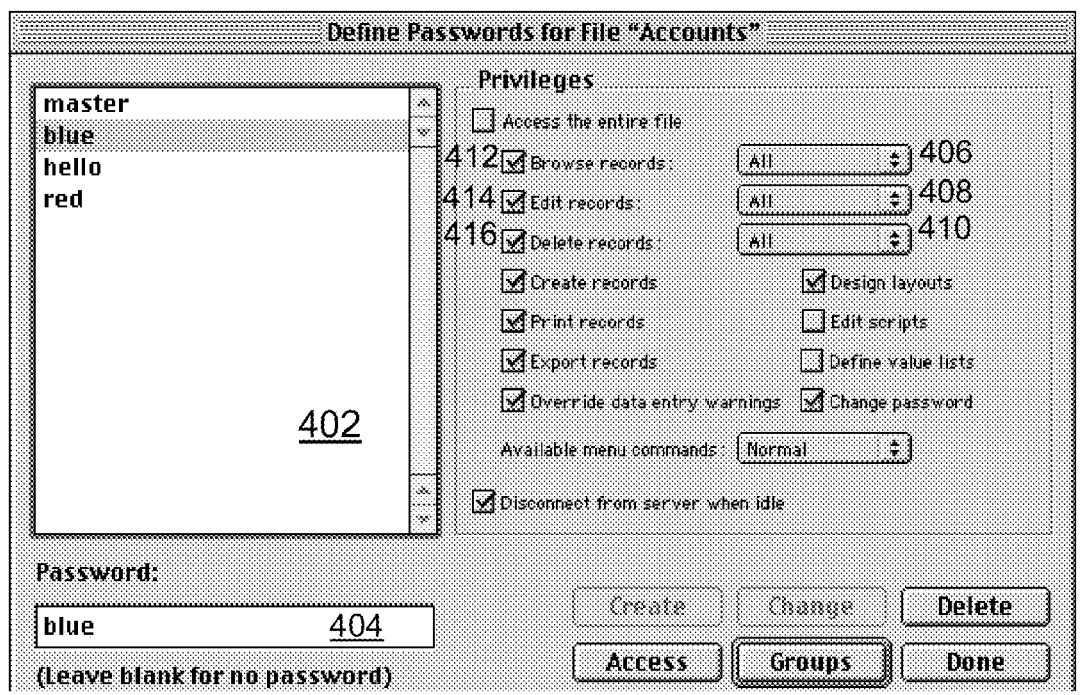
FIGS. 4, 5, 6, and 7 are screen depictions representative of the GUI provided to allow creation and modification of passwords according to one implementation of the invention.
Figure 5:
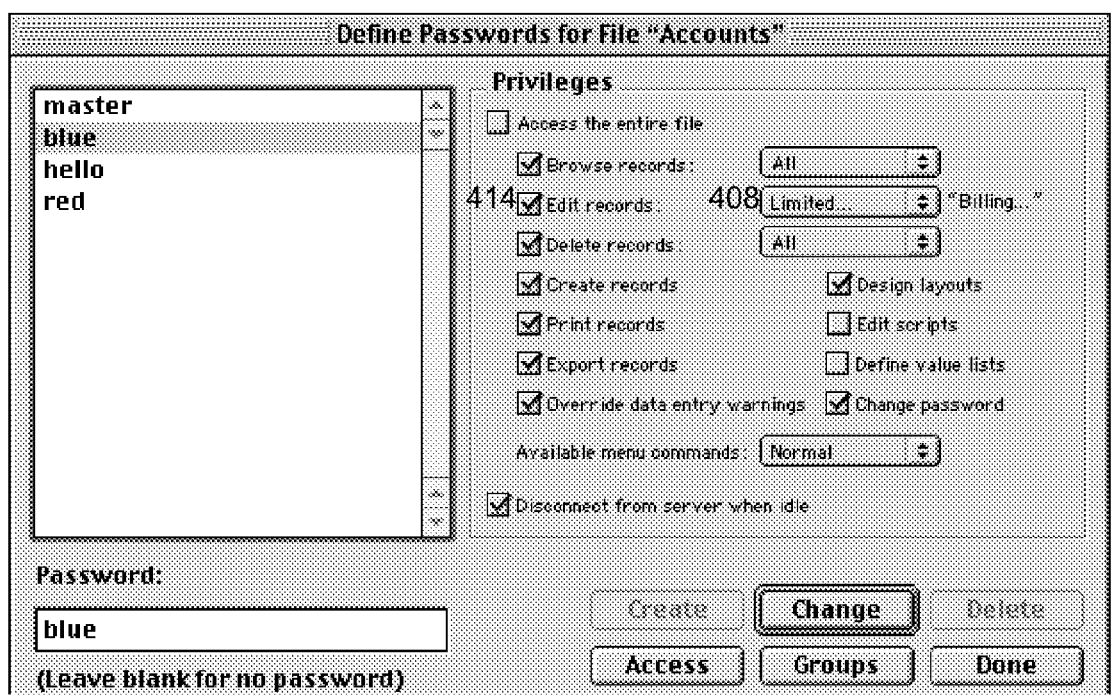

FIG. 4 is a screen depiction of a DEFINE PASSWORD screen 400 provided in accordance with one embodiment of the invention. As shown in FIG. 4, the "DEFINE PASSWORD" screen 400 includes a window 402 that lists an exemplary list of available passwords. A user can select a password from the list of passwords displayed in the window 402. For example, this selection can be performed by placing a highlighted bar on a particular password (e.g., "blue"). Alternatively, the password "blue" or any other password can be entered in a password input portion 404. After the desired password is selected (or entered), one or more of the access privileges indicators 406, 408 and 410 can be used to define access limitations for the selected password. As depicted in FIG. 4, the access privileges indicators 406, 408 and 410 are initially set to "All" to indicate that this password has unlimited access to all records with respect to each of the associated operations represented by indicators "Browse records" 412, "Edit records" 414 and "Delete records" 416. A user may set one or more of the access privileges indicators 406, 408 and 410 to "Limited". To illustrate, FIG. 5 depicts the DEFINE PASSWORDS screen 400 with the access privileges indicator 408 associated with the operation "Edit records" 414 set to "Limited".

Figure 6:
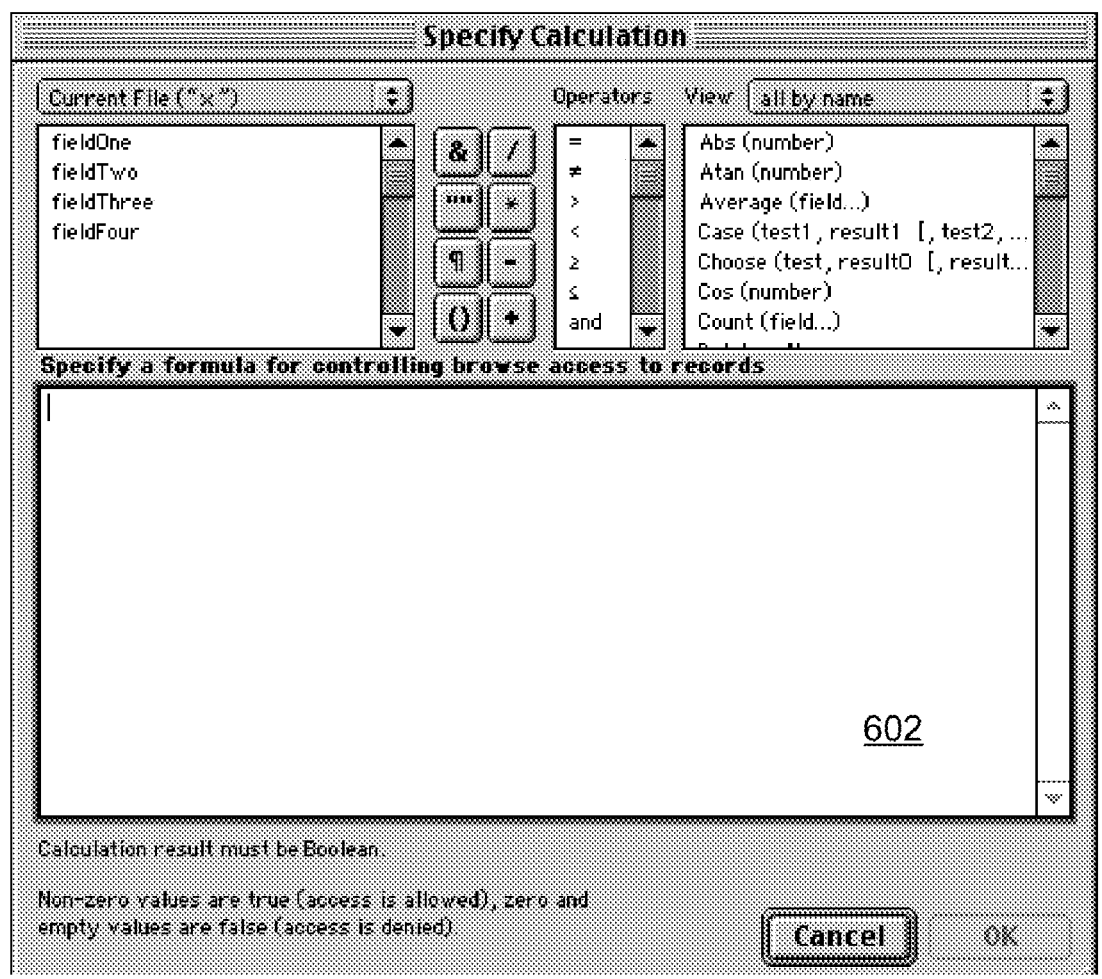

Referring next to FIG. 6, a SPECIFY CALCULATION screen 600 is depicted in accordance with one embodiment of the invention. The SPECIFY CALCULATION screen 600 is presented to a user in response to setting one of the access privileges indicators 406, 408 and 410 of the DEFINE PASSWORDS screen 400 to "Limited". As shown in FIG. 6, an input screen 602 is provided to allow a user to specify a calculation expression to limit access privileges of a selected password (e.g., "blue" of FIG. 5). In this example, access privileges are to be limited with respect to browsing operations. Accordingly, by specifying a calculation expression in the window 602, access privileges of a selected password can be limited with respect to browsing operations that can be performed on the records in the database.

Figure 7:
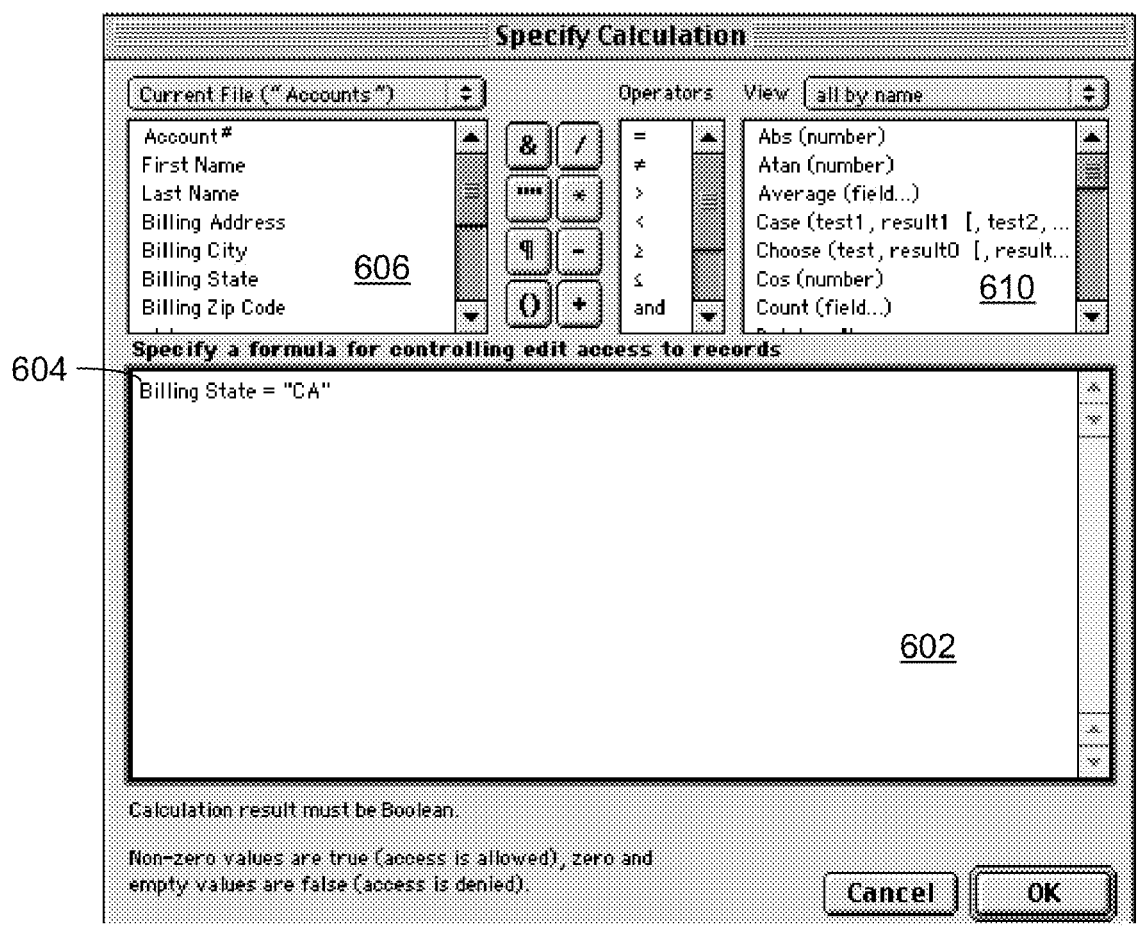

To illustrate how a calculation expression may be specified, FIG. 7 depicts the SPECIFY CALCULATION screen 600 with an exemplary calculation expression 604 entered in the input screen 602. It should be noted that in this example, access privileges for a selected password are to be "Limited" with respect to editing operations that can be performed on the records in the database. The exemplary calculation expression 604 specifies that the field "Billing State" is equal to "CA" (California). In other words, the selected password is to be defined with editing access to a record only when the "Billing State" field of that record is equal to "CA".

It should be noted that windows 606, 608 and 610, as well as calculation pad 612 are provided to allow the user to more conveniently specify a calculation expression. For example, various fields in the database are displayed in window 606. Thus, a user can be informed of the fields available that can be used to define a calculation expression. As another example, the window 608 informs the user of various operations and/or operators that may be available for specifying a calculation expression. It should be noted that a user may conveniently highlight and select an item displayed in windows 606, 608 and 610. Similarly, the calculation pad 612 may conveniently be used to specify various operators to construct a calculation expression. Accordingly, the user may utilize windows 606, 608, 610 and calculation pad 612 to conveniently specify long and complicated calculation expressions. As will be appreciated, in addition to fields, a calculation expression may also include other information; for example, state variables of database (e.g., date, time, number of records, etc.)

Figure 8:
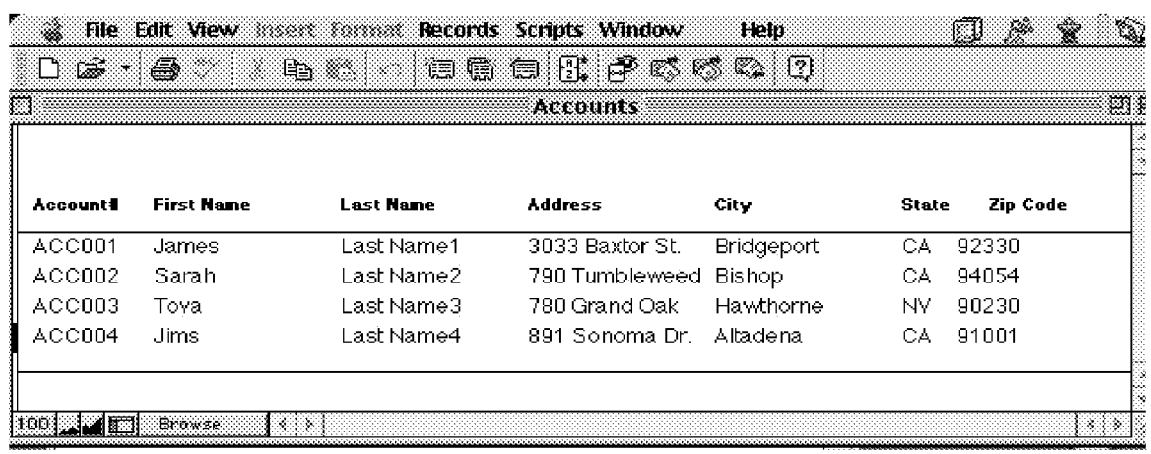
FIG. 8 depicts an exemplary file having various records.

As noted above, a calculation expression can be specified to define a password with limited access privileges with respect to one or more operations in accordance with one embodiment of the invention. The specified calculation expression can, in turn, be evaluated to determine whether access should be granted to the password with respect to an operation that is requested to be performed on the database. Accordingly, the user or group of users associated with the password can be granted or denied access to the records of the database based on the calculation expression that is defined with respect to the requested operation. To illustrate, FIG. 8 depicts an exemplary file ACCOUNTS that includes records "ACC001", "ACC002", "ACC003" and "ACC004" displayed in a window 800. For example, these records can represent billing addresses of customers. A field "State" can indicate, for example, the state portion of the billing address. Recalling the exemplary calculation expression 604 of FIG. 7, given this expression, access to a record with respect to an operation would be granted only when the field "State" (Billing State) of that record is equal to "CA". Accordingly, using the calculation expression 604, access to records shown in FIG. 8 with respect to editing privileges, for example, would be limited to editing records "ACC001", "ACC002", and "ACC004". Thus, the user will not be granted editing privileges to record "ACC003" since the field "State" of this record is not equal to "CA". In this way, a calculation expression can be evaluated with respect to a record to determine whether to grant or deny access to each record.

Figure 9:
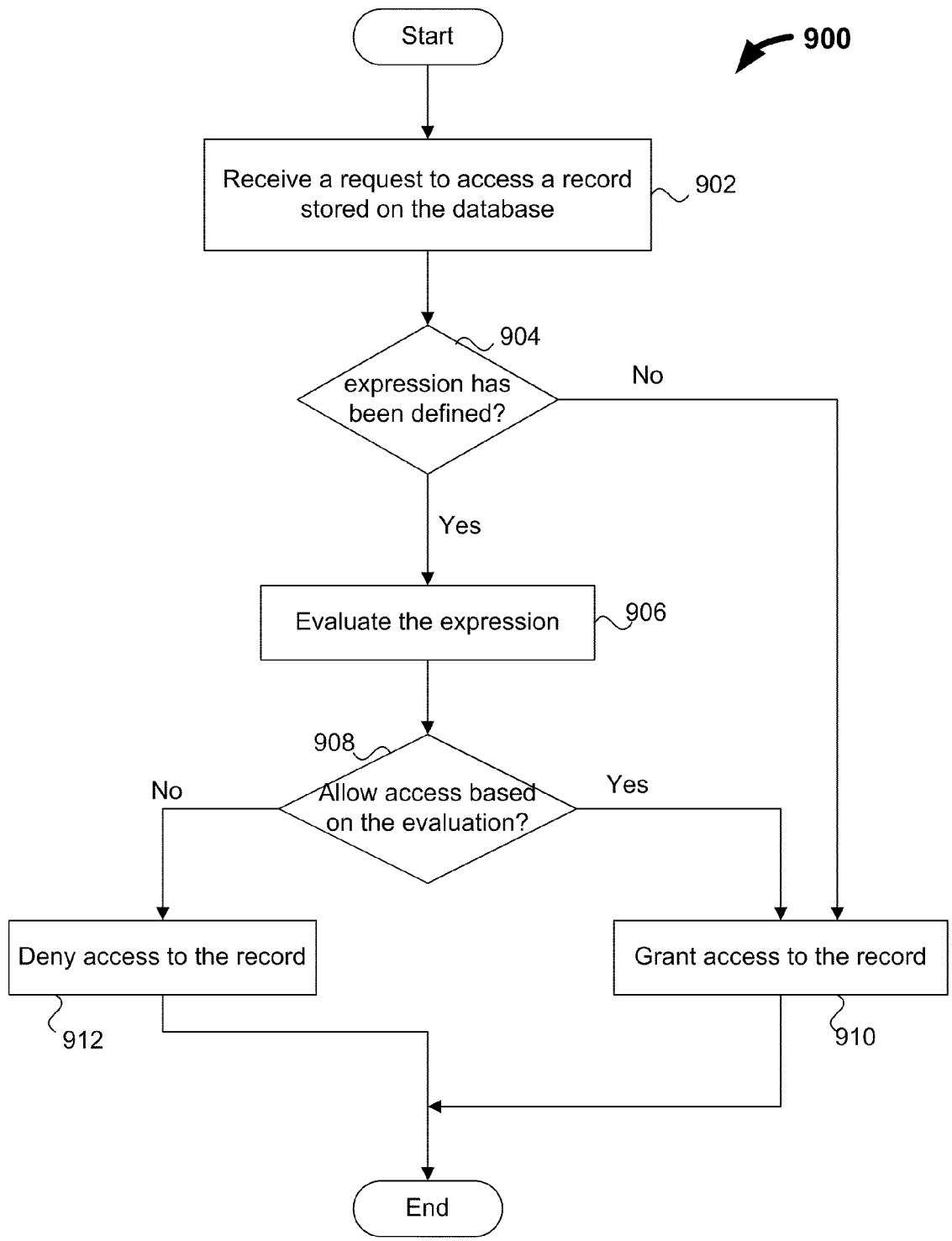
FIG. 9 illustrates a method for determining whether a request to access a record should be granted in accordance with one embodiment of the invention.

To elaborate, FIG. 9 illustrates a method 900 for determining whether a request to access a record should be granted or denied in accordance with one embodiment of the invention. Initially, at operation 902, a request to access a record stored in the database is received. For example, this request may be a request to perform an operation on the record (e.g., a request to browse, edit, or delete a record). Typically, a user or group of users associated with an access identifier can make requests to access the record. As noted above, the user or group of users can be associated with a password, for example. After the request has been received, at operation 904 a determination is made as to whether an expression has been defined with respect to the request. If it is determined at operation 904 that no expression has been defined with respect to the request, the method 900 proceeds directly to operation 910 where access to the record is granted. The method 900 ends following operation 910.

On the other hand, if it is determined at operation 904 that an expression has been defined with respect to the request made to access a record, the method 900 proceeds to operation 906 where the appropriate expression is evaluated. Next, at operation 908, a determination is made as to whether access to the record should be granted or denied based on the evaluation made at operation 906. If it is determined at operation 908 that access should be granted, then the method 900 proceeds to operation 910 where access to the record is granted. However, if it is determined at operation 908 that access should be denied, the method 900 proceeds to operation 912 where access to the record is denied. The method 900 ends following either one of the operations 910 or 912.

Figure 10:
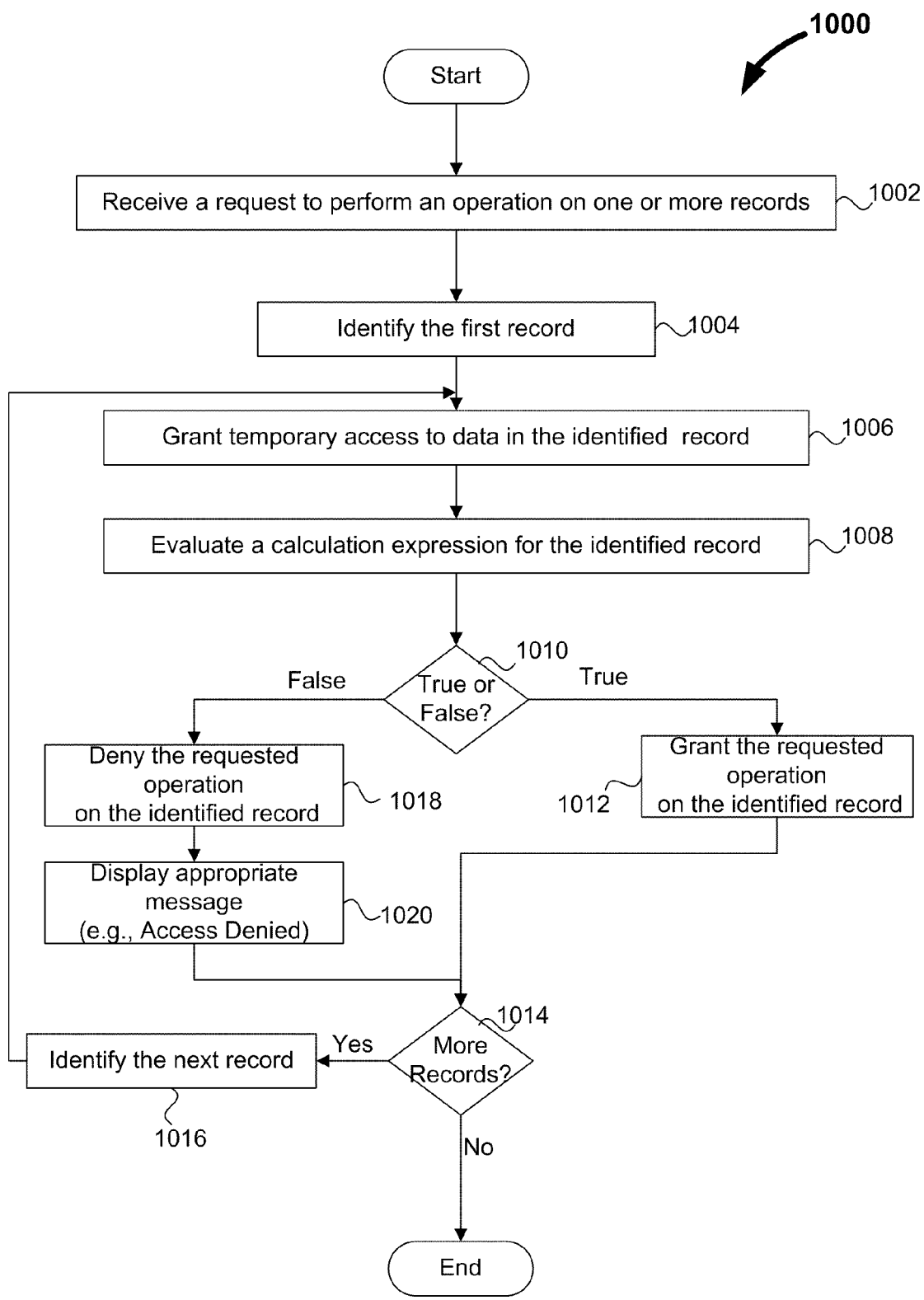
FIG. 10 illustrates a method for determining whether a request to perform an operation on one or more records of a database should be granted in accordance with another embodiment of the invention.

As another example, FIG. 10 illustrates a method 1000 for determining whether a request to perform an operation on one or more records in a database should be granted or denied in accordance with another embodiment of the invention. Initially, at operation 1002, a request is received to perform an operation on one or more records of the database. Next, at operation 1004, the first record for which the operation is requested to be performed is identified.

It should be noted that for illustrative purposes, the embodiment described as method 1000 assumes that a calculation expression has been defined with respect to the requested operation. It should also be noted that in order to evaluate a calculation expression with respect to a particular record, data in that particular record may need to be accessed. Accordingly, at operation 1006, temporary access to data in the (first) identified record is granted. Next, at operation 1008, the appropriate calculation expression is evaluated based on the data in the identified record. For example, a field of the record is accessed to determine whether the value in the field is equal to the value specified in the calculation expression.

The evaluation made in operation 1008 can return a Boolean value (e.g., True or False). Accordingly, based on the evaluation made at operation 1008, a determination is made at operation 1010 as to whether the calculation expression is evaluated as True or False. If it is determined at operation 1010 that the evaluated value is True, the method 1000 proceeds to operation 1012 where the request to perform the operation on the first identified record is granted.

The method 1000 then proceeds to operation 1014 where a determination is made as to whether there is at least one more record for which the operation is requested. If it is determined at operation 1014 that there is not at least one more record for which the operation is requested, the method 1000 ends. However, if it is determined at operation 1014 that there is at least one record for which a request to perform the operation has been made, the method 1000 proceeds to operation 1016 where the next record in the database for which a request to perform the operation has been made is identified. Following the identification of the next record, the method 1000 proceeds to operation 1006 and then to operation 1008 where the calculation expression is evaluated based on the data in the identified record.

On the other hand, if it is determined at operation 1010 that the calculation expression has been evaluated as False, the method 1000 proceeds to operation 1018 where the request to perform the operation on the identified record is denied. Next, at operation 1020, an appropriate message, for example, "Access Denied" can be displayed to inform a user that the request to perform the operation has been denied with respect to this record.

After the appropriate message is displayed, the method 1000 proceeds to operation 1014 where a determination is made as to whether there is at least one more record for which the operation has been requested to be performed. If it is determined at operation 1014 that there is at least one record for which a request to perform the operation has been made, the method 1000 proceeds to operation 1016 where the next record in the database is identified. The method 1000 then proceeds in a manner as described above to determine whether the request to perform the operation should be granted or denied for each one of the one or more records in the database. Finally, when it is determined at operation 1014 that there is not at least one record for which access has not yet been granted or denied, the method 1000 ends.

As will be appreciated, in accordance with one embodiment of the invention, access privileges with respect to one operation that can be performed on records in a database may be interrelated with another operation. For example, access privileges with respect to editing a record may depend on access privileges with respect to browsing that record. Accordingly, a user may be required to have both browsing and editing privileges with respect to a record in order to edit that record. In other words, when a user does not have browsing privileges with respect to a record, the user can automatically be denied editing privileges of that record. On the other hand, access privileges to a record with respect to one operation may be defined as independent of access privileges of another operation that can be performed on that record. For example, the user may have deleting privileges with respect to a record even though the user does not have browsing privileges for that record.

Furthermore, some operations that may be performed on the database may be affected as a result of the access limitations defined for an operation. For example, a search operation of the database can be affected based on the access limitation defined for the user with respect to the user's browsing privileges. As a result, for example, a request to perform a search operation may be granted only on the records for which the user has been granted browsing privileges. Thus, even though an operation is not explicitly defined with limited access for a user, the result of the requested operation may be affected because of a limitation defined with respect to another operation.

Finally, it should also be noted that the evaluated result of calculation expressions can be cached, in accordance with one embodiment of the invention. As will be appreciated, use of a caching system can significantly improve performance of a database program since the repeated calculations of the same expressions may be avoided.

The invention can use a combination of hardware and software components. The software can be embodied as computer readable code on a computer readable medium. The computer readable medium can be any data storage device that can store data which can thereafter be read by a computer system. Examples of computer readable medium include read-only memory, random-access memory, CD-ROMs, magnetic tape, and optical data storage devices. The computer readable medium can also be distributed over a network-coupled computer system so that the code is stored and executed in a distributed fashion.

The advantages of the invention are numerous. Different embodiments or implementations may yield one or more of the following advantages. One advantage of the invention is that record level privileges can be defined for users of a database. Another advantage of the invention is that record level privileges can conveniently be defined through use of a graphical interface. Still another advantage is that the invention can be implemented without significant change to existing user interfaces of database programs. Yet another advantage of the invention is that complex calculation expressions may be constructed without requiring programming.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of controlling access to a plurality of records stored in a database, the method comprising:
    performing the following steps using a computer system:
        receiving a request to perform a first operation on the plurality of records stored in the database;
        receiving an authentication identifier;
        retrieving a calculation expression associated with the requested first operation and with the received authentication identifier, wherein the calculation expression is based on at least one variable field of the plurality of records, wherein the plurality of records includes at least a first and second records, wherein the retrieved calculation expression is evaluated for the first and second records;
        retrieving a first current value from the at least one variable field of the first record;
        evaluating the retrieved calculation expression using the retrieved first current value from the at least one field of the first record; and
        retrieving a second current value from the at least one variable field of the second record;
        evaluating the retrieved calculation expression using the retrieved second current value from the at least one variable field of the second record; and
        granting or denying access to the first operation on the first and second records based on the evaluated calculation expression for the first and second records.

2. The method of claim 1, wherein retrieving the first and second current value includes looking up the at least one variable field of the first and second records in the database.

3. The method of claim 1, wherein the granting or denying access includes sending a message indicating that the access has been denied if the evaluated calculation expression indicates that access should be denied.

4. The method of claim 1, further comprising:
    storing calculations performed during evaluating in a cache, wherein the calculations are reused while evaluating another calculation expression.

5. A method for controlling access to records stored in a database, comprising:
    performing the following steps using a computer system:
        retrieving a calculation expression for a first operation on a plurality of records of the database, wherein the calculation expression is based on at least one variable field of data contained in a plurality of the records of the database, wherein the plurality of records includes at least a first and second record and the retrieved calculation expression is evaluated for the first and second records;
        retrieving a first current value from the at least one variable field of the first record;
        evaluating the retrieved calculation expression using the retrieved first current value from the at least one variable field of the first record;
        retrieve a second current value from the at least one variable file of the second record;
        evaluating the retrieved calculation expression using the retrieved second current value from the at least one variable field of the second record;
        granting or denying access to the first operation on the first and second records based on the evaluated calculation expression for the first and second records;
        evaluating a rule corresponding to the first operation, wherein the rule specifies a linked second operation; and
        granting or denying access to the second operation based on the evaluated rule.

6. The method of claim 5, wherein the linked second operation is an operation for which it is not possible to define a unique expression.

7. The method of claim 6, wherein the first operation is a browse operation and the linked second operation is a search operation.

8. The method of claim 6, wherein the calculation expression was defined using a graphical user interface.

9. A computer readable medium storing computer instructions executed by a processor, the executed computer instructions perform a method comprising:
    receiving a request to perform a first operation on a plurality of records of a database;
    receiving an authentication identifier;
    retrieving a calculation expression associated with the requested first operation and received authentication identifier, wherein the calculation expression is based on at least one variable field of the plurality of records, wherein the plurality of records includes at least the first and second records, wherein the retrieved calculation expression is evaluated for the first and second records;
    retrieving a first current value from the at least one variable field of the first record;
    evaluating the retrieved calculation expression using the retrieved first current value from the at least one field of the first record;
    retrieving a second current value from the at least one variable field of the second record;
    evaluating the retrieved calculation expression using the retrieved second current value from the at least one variable field of the second record; and
    granting or denying access to the first operation on the first and second records based on the evaluated calculation expression for the first and second records.

10. The computer readable medium of claim 9, wherein the first operation links to a second operation, wherein the linked second operation is an operation for which it is not possible to define a unique expression.

11. The computer readable medium of claim 9, wherein granting or denying access to the first operation includes sending a message indicating that the access has been denied if the evaluated calculation expression indicates that access should be denied.

12. The computer readable medium of claim 9, wherein the executed computer instruction further performs a step comprising:
    storing calculations performed during evaluating in a cache, wherein the calculations are reused while evaluating another calculation expression.

13. An apparatus comprising:
    a processor;
    a database;
    an interface arranged to:
        receive a request to perform a first operation on the plurality of records stored in the database;
        receive an authentication identifier;
        retrieve a calculation expression associated with the requested first operation and the received authentication identifier, wherein the calculation expression is based on at least one variable field of the plurality of records, wherein the plurality of records includes at least a first and second records, wherein the retrieved calculation expression is evaluated for the first and second records;

retrieve a first current value from the at least one variable field of the first record;
evaluate, using a calculation expression module, the retrieved calculation expression using the retrieved first current value from the at least one field of the first record; and
retrieve a second current value from the at least one variable field of the second record;
evaluate the retrieved calculation expression using the retrieved second current value from the at least one variable field of the second record; and grant or deny access to the first operation on the first and second records based on the evaluated calculation expression for the first and second records, using an access control module.

14. The apparatus of claim 13, wherein the calculation expression module is further arranged to evaluate the calculation expression for each of the plurality of records.

15. The apparatus of claim 14, wherein the calculation expression is associated with more than one operation.

* * * * *

UNITED STATES PATENT AND TRADEMARK OFFICE
CERTIFICATE OF CORRECTION

| | | |
|---|---|---|
| PATENT NO. | : 7,958,146 B2 | Page 1 of 1 |
| APPLICATION NO. | : 12/773607 | |
| DATED | : June 7, 2011 | |
| INVENTOR(S) | : Crim et al. | |

It is certified that error appears in the above-identified patent and that said Letters Patent is hereby corrected as shown below:

On Title page 2, in column 2, under "Other Publications", line 6, after "Inc.," delete "New York,".

In column 11, line 57, in claim 5, delete "file" and insert -- field --, therefor.

Signed and Sealed this
Twenty-ninth Day of November, 2011

David J. Kappos
*Director of the United States Patent and Trademark Office*